United States Patent
Akyildiz (10) Patent No.: US 12,252,445 B1
(45) Date of Patent: Mar. 18, 2025

(54) ELECTRICALLY CONDUCTIVE BORON-CONTAINING MATERIAL WITH HEAT AND IMPACT RESISTANCE

(71) Applicant: POW-STOR INC., Boca Raton, FL (US)

(72) Inventor: Saban Akyildiz, Boca Raton, FL (US)

(73) Assignee: POW-STOR INC., Boca Raton, FL (US)

( * ) Notice: Subject to any disclaimer, the term of this patent is extended or adjusted under 35 U.S.C. 154(b) by 0 days.

(21) Appl. No.: 19/010,930

(22) Filed: Jan. 6, 2025

Related U.S. Application Data (62) Division of application No. 18/793,580, filed on Aug. 2, 2024, now Pat. No. 12,221,383.

(51) Int. Cl.
| | |
|---|---|
| H01B 1/08 | (2006.01) |
| C04B 35/00 | (2006.01) |
| H01B 7/00 | (2006.01) |
| C04B 35/622 | (2006.01) |
| H01B 7/29 | (2006.01) |
| H01B 7/295 | (2006.01) |

(52) U.S. Cl.
CPC ............... *C04B 35/00* (2013.01); *H01B 1/08* (2013.01); *H01B 7/0009* (2013.01); *H01B 7/0027* (2013.01); *C04B 35/62222* (2013.01); *C04B 2235/3409* (2013.01); *C04B 2235/5454* (2013.01); *H01B 7/292* (2013.01); *H01B 7/295* (2013.01)

(58) Field of Classification Search
CPC ............ C04B 35/00; C04B 35/62222; C04B 2235/3409; C04B 2235/5454; H01B 1/08; H01B 7/0009; H01B 7/0027; H01B 7/292; H01B 7/295
See application file for complete search history.

(56) References Cited

U.S. PATENT DOCUMENTS

| | | | | |
|---|---|---|---|---|
| 6,247,225 B1 | 6/2001 | Snitchler | ............... | H10N 60/203 |
| | | | | 29/599 |
| 2003/0207765 A1 | 11/2003 | Bower | ............... | H10N 60/0856 |
| | | | | 505/100 |
| 2004/0121915 A1 | 6/2004 | Tanaka | ................. | H10N 60/202 |
| | | | | 505/100 |
| 2008/0274901 A1 | 11/2008 | Glowacki | .......... | H10N 60/0856 |
| | | | | 174/102 R |
| 2009/0170992 A1* | 7/2009 | Rushkin | .................. | C08K 3/22 |
| | | | | 264/642 |
| 2011/0094777 A1 | 4/2011 | Swift | ................. | G01R 1/06711 |
| | | | | 977/773 |
| 2013/0025907 A1 | 1/2013 | Zheng | ...................... | H01B 1/04 |
| | | | | 174/105 R |
| 2014/0100118 A1 | 4/2014 | Doll | ...................... | H10N 60/202 |
| | | | | 505/231 |
| 2024/0079861 A1 | 3/2024 | Huang | ..................... | B60M 1/22 |

\* cited by examiner

*Primary Examiner* — Steven T Sawyer
(74) *Attorney, Agent, or Firm* — Dentons US LLP (57) ABSTRACT

An electrical system that includes a power source, a load, and an electrical connection operable to conduct electricity between the power source and the load, the electrical connection including an outer casing comprising a non-conducting material, and a material disposed within the outer casing, wherein the material is electrically conductive, the material including a boron-containing material and metal oxide nanoparticles, wherein the electrical connection includes a wire or cable.

6 Claims, 5 Drawing Sheets

ELECTRICALLY CONDUCTIVE BORON-CONTAINING MATERIAL WITH HEAT AND IMPACT RESISTANCE

CROSS-REFERENCE TO RELATED APPLICATION

This application is a divisional of U.S. patent application Ser. No. 18/793,580, filed Aug. 2, 2024, which is hereby incorporated by reference.

TECHNICAL FIELD

This disclosure relates generally to boron-containing materials. More particularly, in some embodiments, this disclosure relates to an electrically conductive boron-containing material in the form of a foam or coating for protection from heat and impact.

BACKGROUND

Various systems need to operate at high temperatures and may be exposed to physical stresses, such as high intensity impacts. For example, defensive vehicles, whether traveling by air, land, or sea, may be targeted by high intensity projectiles and/or high temperatures. There exists a need for materials with improved durability under such conditions.

SUMMARY

The present disclosure provides a composition that includes boron and metal oxide nanoparticles. A material prepared from the composition can be employed in a range of applications due to its unique and beneficial thermal, physical, and electronic properties. For example, as described further below, the material may be used as a fire retardant or thermal barrier in a range of systems and devices. For instance, the material may be used as a protective layer (e.g., in armor or other physical shielding). In some cases, the material is used to make conformal protective coatings (e.g., as a paint-like substance spread over a surface or a substance sprayed on a surface) and/or molded into desired shapes with the beneficial intact. In some cases, the material is used to conduct electricity in an electronic system. In at least certain cases, the material may serve two or more of these functions simultaneously. For example, a protective coating may provide resistance to fire while also providing protection against physical damage. As another example, a conductive wire or cable made using the foam-like material may provide improved electrical performance while also providing protection against heat-induced damage, such as from a fire.

In one aspect, the present disclosure provides a composition that includes a boron-containing material and metal oxide nanoparticles. In some embodiments, the boron-containing material includes a boron mineral. In some embodiments, the composition comprises the boron-containing material at a percent by weight in a range from 45% to 60%. In some embodiments, the composition comprises the metal oxide nanoparticles at a percent by weight in a range from 12% to 18%. In some embodiments, the composition also includes a liquid in which the boron-containing material and metal oxide nanoparticles are mixed. The composition may include the liquid at a percent by weight in a range from 30% to 34%. The liquid may be water. The liquid may include one or more salts and/or other additives. For example, the liquid may be an aqueous boric acid solution.

In another aspect, the present disclosure provides a method of forming a material that includes steps of combining a boron-containing material and metal oxide nanoparticles in a liquid, mixing the combined boron-containing material and metal oxide nanoparticles to form an initial mixture, and allowing the initial mixture to dry to form the foam-like material. The method may further include a step of applying the initial mixture to a surface (e.g., by pouring, painting, spraying, or using another known method), within sidewalls of a structure, or to a mold prior to allowing the initial mixture to dry.

In yet another aspect of the present disclosure, a reinforced or protected component is provided that has a surface coated with the boron-containing material of this disclosure. The component includes a surface and the coating disposed on at least a portion of the surface. The coating includes a material (e.g., foam-like or liquid) with the boron-containing material and metal oxide nanoparticles. In some embodiments, the coating conforms to a shape of the surface. In some embodiments, the boron-containing material includes a boron mineral. The boron mineral may be one or both of colemanite and boric acid. The material may be prepared from a mixture of the boron-containing material and metal oxide nanoparticles in water. The component may be all or a portion of a structure, a vehicle, an article of clothing, or a piece of armor.

In some embodiment, a molded component is provided that is formed from the disclosed material.

In some embodiments, an electronic system is provided that has two electrical components, such as a source and a load, which are electronically coupled by a continuous section of the material of this disclosure. The section of the material provides an electrical connection between the source and load. A wire, cable, or other electrical connection provided using the material may be at least partially surrounded by an outer casing (e.g., insulating material, such as plastic). In some cases, this aspect of the invention may provide electrical connections that have a high conductivity, including the ability to provide a charging rate that is at least three times that of a conventional copper wire. An electrical connection provided by the material of this disclosure may also be resistant to thermal damage and fire as well as being resistant to damage due to physical impact.

Other devices and methods according to embodiments of the present disclosure will be apparent to a person skilled in the art upon review of the following drawings and detailed description. It is intended that all such additional devices and methods be included within this description and within the scope of this disclosure.

BRIEF DESCRIPTION OF THE DRAWINGS

Non-limiting and non-exhaustive examples are described with reference to the following figures.

FIGS. 5A-5C illustrate the formation of a molded component formed from the material of FIG. 1B.

DETAILED DESCRIPTION

The following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. The following detailed description is therefore not to be taken in a limiting sense, and the scope of the present disclosure is defined by the appended claims and their equivalents.

Figure 1A:
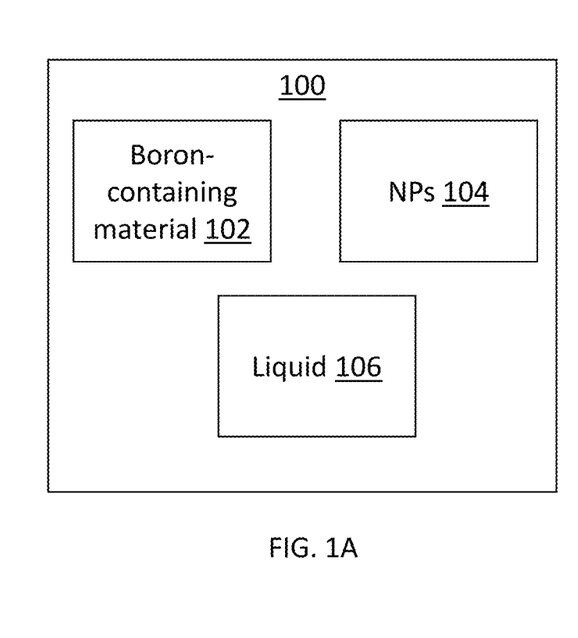
FIG. 1A is a block diagram showing a boron-containing composition, according to an embodiment of the present disclosure.
Figure 1B:
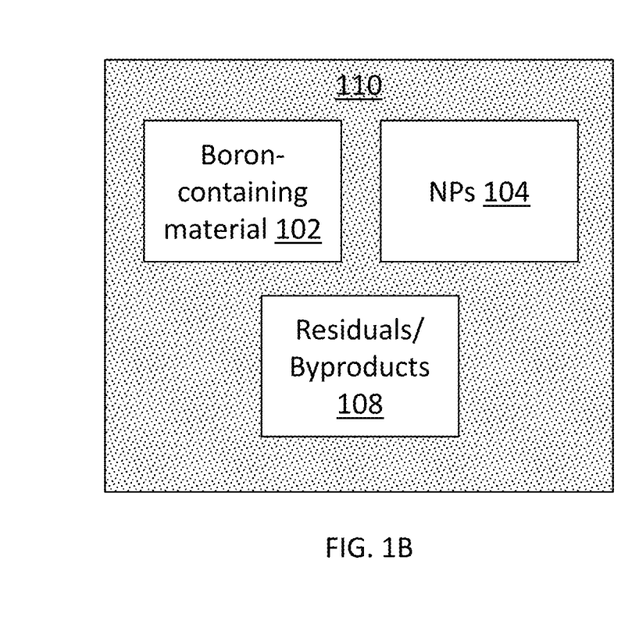
FIG. 1B is a block diagram of an example of a material that can be prepared using the composition of FIG. 1A.

Composition for Forming an Electrically Conductive Material that is Heat and Impact Resistant:

FIG. 1A shows an exemplar composition 100 that can be used to create, or form, the material (e.g., may be foam-like or a surface coating) of FIG. 1B. The composition 100 is initially formed as a liquid mixture. However, following mixing and allowing the composition 100 to dry the composition forms the material 110 of FIG. 1B. The material 110 displays unexpected electrical, thermal, and physical properties that are beneficial for a number of applications as described in greater detail with respect to the examples of FIGS. 2-6 below. The material 110 has a lower density than that of water and therefore is light weight and can be used in a number of applications. The material 110 can withstand temperatures of up to at least 2600° C. and does not catch fire when exposed to a high intensity laser. The material 110 can provide protection against impacts and is bulletproof. The material 110 has an unexpected ability to conduct electricity and can be used for improved power transfer. The material 110 allows electrical power transfer at three-times the rate of a conventional copper charging wire.

Referring to FIG. 1A, the composition 100 includes boron-containing material(s) 102, nanoparticles 104, and a liquid 106. The boron-containing material(s) 102 may be a boron mineral, such as kernite ($Na_2B_4O_7 \cdot 4H_2O$), tincalconite ($Na_2B_4O_7 \cdot 5H_2O$), tincal ($Na_2B_4O_7 \cdot 10H_2O$), probertite ($NaCaB_5O_9 \cdot 5H_2O$), ulexite ($NaCaB_5O_9 \cdot 8H_2O$), colemanite ($Ca_2B_6O_{11} \cdot 5H_2O$), meyerhofferite ($Ca_2B_6O_{11} \cdot 7H_2O$), inyoite ($Ca_2B_6O_{11} \cdot 13H_2O$), pandermite ($Ca_4B_{10}O_{19} \cdot 7H_2O$), inderite ($Mg_2B_6O_{11} \cdot 15H_2O$), hydroboracite ($CaMgB_6O_{11} \cdot 6H_2O$), boracite ($Mg_3B_7O_{13}Cl$), ascharite ($Mg_2B_2O_5 \cdot H_2O$), datolite ($Ca_2B_2Si_2O_9 \cdot H_2O$), or boric acid (e.g., sassolite, $H_3BO_3$). In some cases, the boron-containing material 102 is a mixture of colemanite and boric acid. All or a portion of the boric acid may be dissolved in the liquid 106, described below, such that boric acid included as the boron-containing material 102 may be included in the liquid 106. The boron-containing material 102 may be present in the composition 100 at a mass percentage from about 45% to 60%.

In some cases, the boron-containing material(s) 102 may include borophene or borophene particles. Borophene is a single layer of boron atoms that forms various crystalline structures. Borophene particles may be particles made up of borophene. The borophene particles may have a particle size in a range from in a range from 0.001 to 2 μm.

The nanoparticles 104 ("NPs" in FIGS. 1A and 1B) may be metal oxide nanoparticles. The metal oxide may be any metal oxide (e.g., of the form $MO_x$ where M is the metal, O is oxygen, and x is the number of oxygen molecules in the metal oxide). Examples of metal oxide nanoparticles that may be used as nanoparticles 104 include, but are not limited to, $Fe_2O_3$, $SiO_2$, $Al_2O_3$, $MgO$, $ZrO_2$, $CeO_2$, $TiO_2$, and $ZnO$. The nanoparticles 104 may have a particle size in a range from 0.01 to 1000 nm. The nanoparticles 104 may be present in the composition 100 at a mass percentage from about 12% to 18%.

The liquid 106 acts as a medium for mixing other components of the composition 100 in order to form the material 110 of FIG. 1B. The liquid 106 may be water. The liquid 106 may include one or more salts and/or other additives (e.g., to adjust an ionic strength, pH, and the like of the liquid 106). In some cases, the liquid 106 is an aqueous boric acid solution. The liquid 106 is present in the composition at a percent by weight from about 30% to 34%.

FIG. 1B illustrates an exemplar material 110 formed from the composition 100 of FIG. 1A. The material 110 is generally formed by combining the boron-containing material 102 and nanoparticles 104 in the liquid 106. These components are then mixed or otherwise agitated to form an initial mixture, which can be manipulated (e.g., by pouring) like a liquid. This mixture may be sufficiently mixed or agitated to cause air to be dispersed within the liquid 106 to aid in forming the material 110. This mixture is then allowed to dry to form the material 110. In some case, the mixture may be heated and/or held at a decreased pressure to aid in drying. Following this process, the material 110 is formed.

The material 110 includes the boron-containing material 102 and nanoparticles 104. These components may be in their original form or may have been altered (e.g., chemically and/or physically) during the foam-formation process. The material 110 may also include other residual material and/or byproducts 108 of the foam formation process. For example, the residual material and/or byproducts 108 may include residual salts from dissolved or partially dissolved boron minerals and/or other components originally included in the liquid 106 that remain after foam formation.

The material 110 has a lower density than that of water (i.e., the material 110 can float on water). The material 110 can withstand temperatures of up to at least 2600° C. The material 110 does not catch fire when exposed to a high intensity laser. The material 110 is bulletproof or bullet resistant. Tests have shown that the material 110 can conduct electricity at least as well as copper wire. The material 110 can allow electrical power transfer (e.g., from a source to a load—see example of FIG. 6) at three-times the rate of a conventional copper charging wire.

Figure 2:
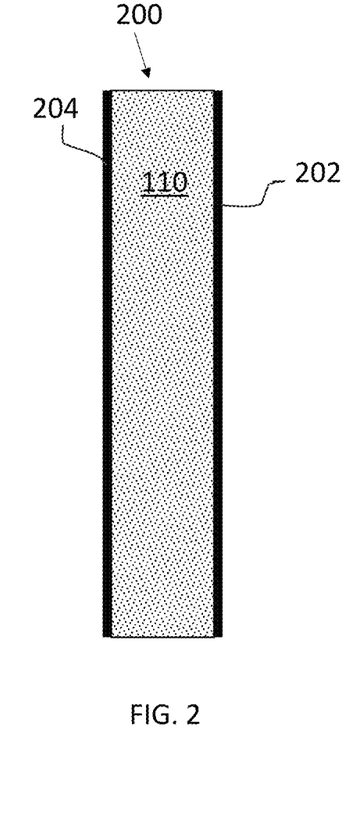
FIG. 2 is a diagram illustrating an exemplar packed siding that includes the material of FIG. 1B between two walls of a structure or component.
Figure 3:
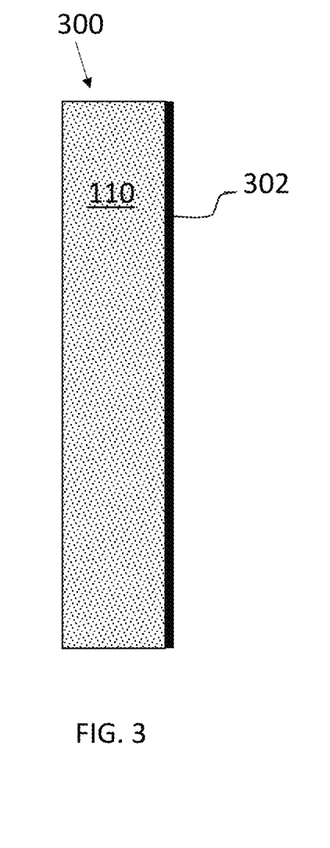
FIG. 3 is a diagram illustrating an exemplar surface coated with the material of FIG. 1B.
Figure 4:
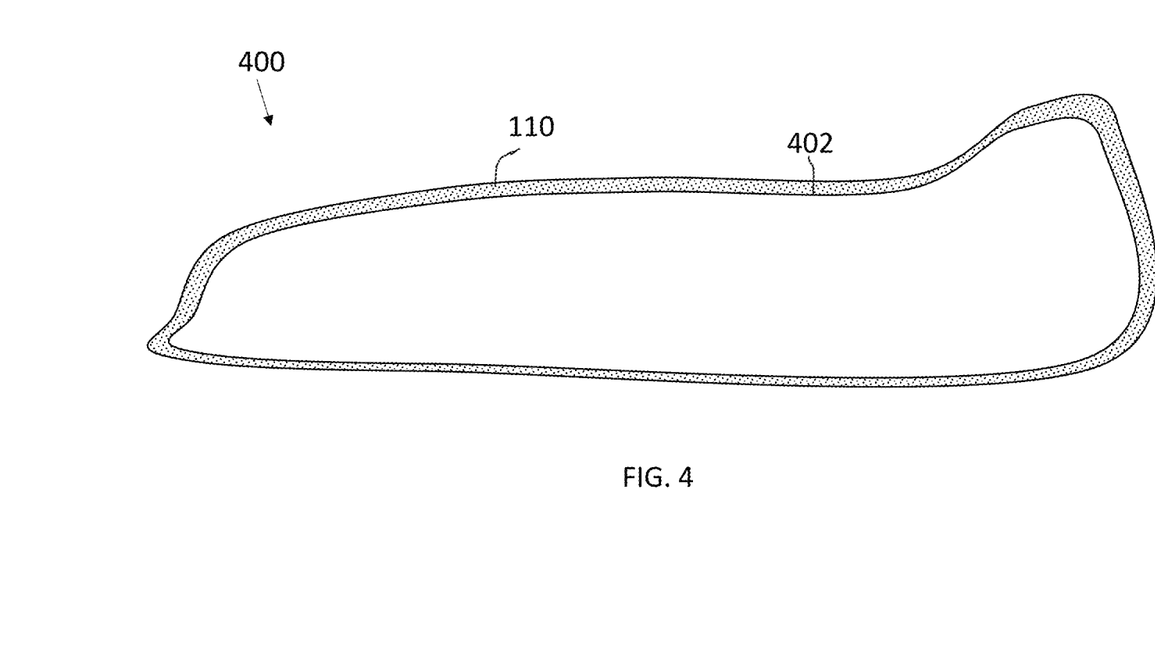
FIG. 4 is a diagram illustrating an exemplar surface with a conformal coating that includes the material of FIG. 1B.

Protected and Reinforced Components for Structures, Vehicles, and the Like:

FIGS. 2-4 illustrate various examples of components that are protected from heat, impacts (e.g., bullets or other high intensity impacts), and other similar stresses using the material 110 of FIG. 1B.

FIG. 2 shows an exemplar structural component 200 that provides protection against heat, impact, and/or other stresses. The structural component 200 includes an inner wall 202, an outer wall 204, and the material 110 disposed between the inner wall 202 and the outer wall 204. The structural component 200 may be formed by applying the composition 100 between the walls 202, 204 and allowing the composition 100 to dry to form the material 110.

The structural component 200 can generally be all or a portion of any structure, device, or apparatus needing thermal and/or physical protection. For example, the structural component 200 may be a wall, roof, or floor of a building or room. As another example, the structural component 200 may be siding of a vehicle, such as an aircraft, rocket, spacecraft, automobile, boat, drone, or the like. As another example, the structural component 200 may be a part of an engine. The structural component 200 may be a piece of armor.

FIG. 3 shows an example of a reinforced or protected component 300 with a coating of the material 110 disposed on a surface. The component 300 may be formed by applying the composition 100 on the surface 302 and allowing the composition 100 to dry to form the material 110.

FIG. 4 shows a variation of a component 400 in which the material 110 forms a conformal coating on an irregular surface 402. Like component 300 of FIG. 3, the component 400 may be formed by applying the composition 100 on the surface 402 and allowing the composition 100 to dry to form the material 110.

The components 300, 400 can generally be all or a portion of any structure, device, or apparatus needing thermal and/or physical protection. For example, the components 300, 400 may be a wall, roof, or floor of a building or room. As another example, the components 300, 400 may be siding of a vehicle, such as an aircraft, rocket, drone, spacecraft, automobile, boat, drone, or the like. As another example, the components 300, 400 may be a part of an engine. The components 300, 400 may be a piece of armor. The components 300, 400 may be an article of clothing.

Figure 5A:
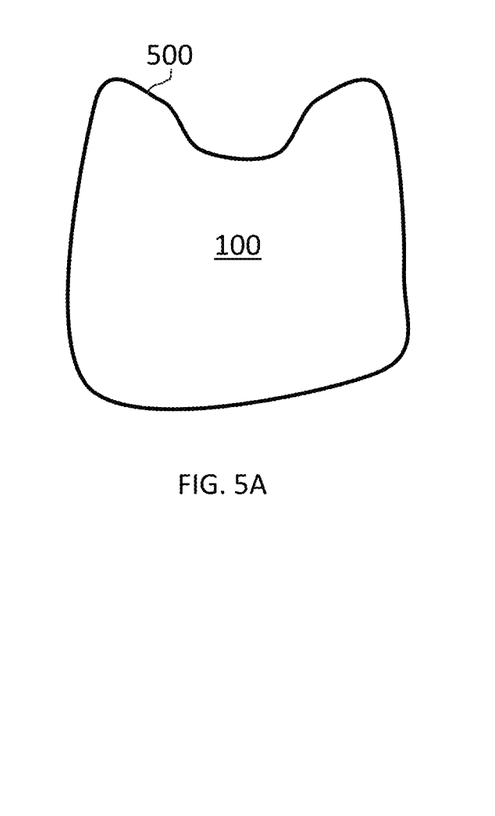
FIG. 5A is a diagram illustrating an exemplar mold with an amount of the composition of FIG. 1A placed within the mold.
Figure 5B:
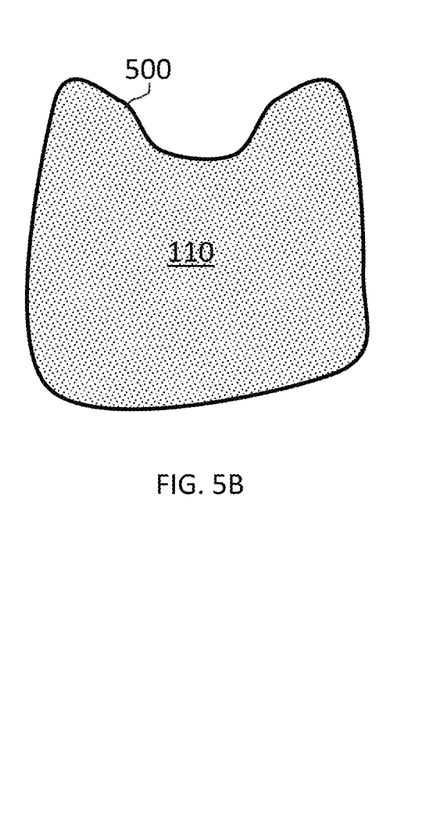
FIG. 5B is a diagram illustrating the exemplar mold with the material of FIG. 1B formed within the mold.
Figure 5C:
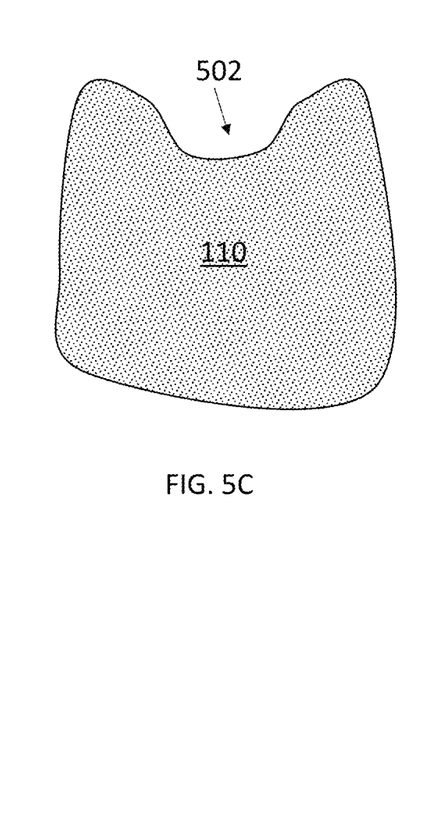
FIG. 5C is a diagram illustrating the final component, or mold replica, which is formed using the mold.

Molded Structures Formed from the Material:

FIGS. 5A-5C illustrate the formation of a molded component 502 from the material 110. FIG. 5A illustrates an exemplar mold 500, which can generally have an arbitrary structure selected for a given component type. For example, if the component 502 will be used as a helmet or body armor, the mold 500 will have a corresponding shape. The composition 100 is generally added to the mold 500 and allowed to dry to form the material within the mold 500, as shown in FIG. 5B. Once the material 110 is prepared, it can be removed from the mold 500 to achieve the molded component 502, shown in FIG. 5C, which is a replica of the mold 500.

The molded component 502 can generally be all or a portion of any structure, device, or apparatus needing thermal and/or physical protection. For example, the molded component 502 may be used in a wall, roof, or floor of a building or room. As another example, the molded component 502 may be used in a vehicle, such as an aircraft, rocket, drone, spacecraft, automobile, boat, drone, or the like. As another example, the molded component 502 may be a part of an engine (e.g., as a protective covering). The molded component 502 may be a piece of armor or placed in clothing.

Figure 6:
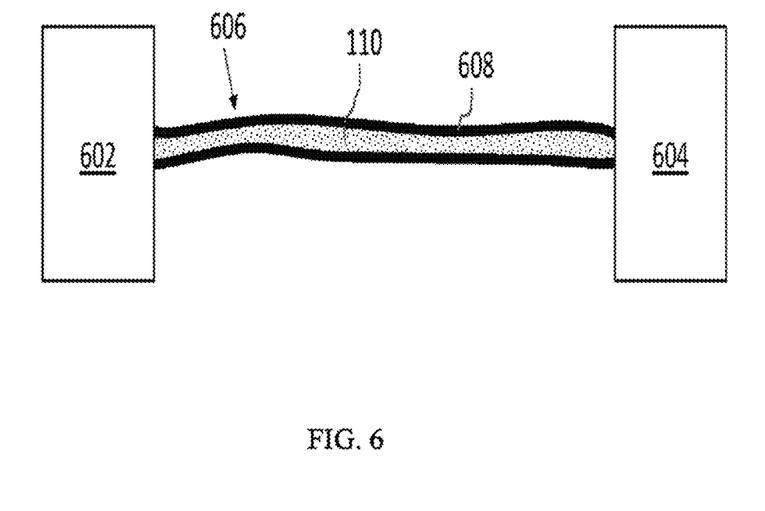
FIG. 6 is a diagram illustrating an exemplar electronic system with an electrical connection formed using the material of FIG. 1B.

Highly Conductive Electronic Connection that is Heat and Impact Resistant:

FIG. 6 illustrates an exemplar electronic system 600 in which an electrical connection 606 (which can also be referred to as "wire" or "cable" in some cases) is provided using the material 110 of FIG. 1B. The electronic system 600 includes a power source 602 (e.g., a battery or other source of electrical power) and a load 604 (e.g., an electronic component being powered or charged) that are electronically coupled by the electrical connection 606. The electrical connection 606 includes the material 110 as its electrically conductive element. The electrical connection 606 includes an outer casing 608 of a non-conducting material (e.g., plastic) and the material 110 within the outer casing 608. The electrical connection 606 forms a continuous electrical connection between the source 602 and the load 604. In some cases, the power source 602 is a an electrical outlet and the load 604 is a battery. In this case, the electrical connection 606 facilitates rapid charging of the battery. In some cases, the source 602 and load 602 represent other points of electrical contact in a system requiring transfer of electrical power or signals. For example, the source 602 and load 604 may be points of electrical contact in a computer component, such as a chip or processors. In such cases, the electrical connection 606 may provide electrical connection between these points. For instance, the material 110 may be used to interconnect points in a chip or processor. In such cases, the outer casing 608 may sometimes be absent (if not needed in a given architecture) or the outer casing 608 may be a coating of a non-conductive material that is compatible with other materials in the computer component.

The electrical connection 606 may be formed by forming the material 110 within the casing 608 or by forming a length of the material 110 (e.g., in a mold as shown in FIGS. 5A-5C) and covering the material 110 with the casing 608. Initial tests have shown that a wire with the structure of electrical connection 606 performs at least as well as a conventional copper wire and can be used to transfer power at three-times the rate achieved by a conventional copper wire.

Due to the above-described unique properties, the composition of the present disclosure may be used in a wide range of applications, such as defense drones, ships, boats, planes, trains, robots, laser applications, motorcycles, electric vehicles, and power plants. For example, the material of this disclosure (e.g., material 110) can be used in the siding of spacecraft that will re-enter Earth's atmosphere. The material is lightweight and resistant to the temperatures experienced during re-entry. For example, the material may be used to provide defense to thermal (e.g., laser) and/or projectile attacks to various vehicles, whether on land, sea, air, or space. The lightweight nature of the material may particularly be adapted for use in drones or other vehicles sensitive to added weight (e.g., other aircraft, boats, high-performance automobiles). In some cases, the material may provide a protective layer to critical components, such as an engine, control system, or the like. The material may be used to enhance the strength of fiber optic cables such as the ones used for audio and data transmission. The material can be used in brakes, for example, as a replacement for asbestos by breaking the material into pieces or particles that can be incorporated into brake pads. The material may be used as a reinforcing layer in various components, such as rubber hoses and expansion joints. This may make these components stronger (e.g., by protecting against punctures or other damage) and more adapted to high temperature environments.

As another example, the material can be used to provide electrical connections in any system, device, or vehicle that may experience high temperatures or potential physical impacts (e.g., from projectiles or collisions), such that electrical connections are more robust in challenging operating environments. For example, the material may be used in power generation, power transmission, power distribution, telecommunications, electronics circuitry, and other types of electrical equipment. Moreover, due to the conductive nature of the material, the material may be used in computer components, such as chips and processors. These components benefit not only from the improved electrical properties of the material but also from the heat and impact resistance provided by the material. As another example, the electrically conductive material may be used to conduct electricity in clothing, for example, in clothing adapted to generate electricity or in "smart" clothing where the material can be included to provide signal/power transfer between sensors embedded in the clothing and any associated electronics, such as batteries, controllers, and/or transmitters.

Non-Limiting Definitions

The terms "a", "an" and "the" are intended to include the plural forms as well, unless the context clearly indicates otherwise.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

Several implementations of the disclosed technology are described above in reference to the figures. The computing devices on which the described technology may be implemented can include one or more central processing units, memory, input devices, output devices (e.g., display devices), storage devices, and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes are presented in a given order, alternative implementations may perform routines having steps in a different order, and some processes may be deleted, moved, added, subdivided, combined, and/or modified to provide alternative or sub-combinations. Each of these processes may be implemented in a variety of different ways. Also, while processes are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

I claim:

1. A structural component comprising:
   an inner wall;
   an outer wall; and
   a material disposed between the inner wall and the outer wall, wherein the material comprises
   a boron-containing material; and
   metal oxide nanoparticles,
   wherein the material is prepared from a mixture of the boron-containing material and metal oxide nanoparticles in a liquid, the mixture comprises the boron-containing material at a percent by weight in a range from 45% to 60%, the metal oxide nanoparticles at a percent by weight in a range from 12% to 18%, and the liquid at a percent by weight in a range from 30% to 34%, and
   wherein the material provides protection against heat, impact, and/or other stresses for the structural component.

2. The structural component of claim 1, wherein the boron-containing material comprises a boron mineral.

3. The structural component of claim 1, wherein the component is at least a portion of a structure, a vehicle, an article of clothing, or a piece of armor.

4. A reinforced component, comprising:
   a surface; and
   a coating disposed on at least a portion of the surface, the coating comprising a material comprising:
   a boron-containing material; and
   metal oxide nanoparticles, wherein the material is prepared from a mixture of the boron-containing material and metal oxide nanoparticles in a liquid, the mixture comprises the boron-containing material at a percent by weight in a range from 45% to 60%, the metal oxide nanoparticles at a percent by weight in a range from 12% to 18%, and the liquid at a percent by weight in a range from 30% to 34%, and wherein the material provides protection against heat, impact, and/or other stresses for the reinforced component.

5. The component of claim 4, wherein the coating conforms to a shape of the surface.

6. The component of claim 4, wherein the boron-containing material comprises a boron mineral that comprises one of colemanite and boric acid.

\* \* \* \* \*